United States Patent
Hyun

(10) Patent No.: US 8,127,330 B2
(45) Date of Patent: Feb. 28, 2012

(54) DISPLAY DEVICE AND METHOD OF MANAGING LIST OF CHANNEL INFORMATION IN VIDEO DISPLAY DEVICE

(75) Inventor: Park Sang Hyun, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 1712 days.

(21) Appl. No.: 11/049,744

(22) Filed: Feb. 4, 2005

(65) Prior Publication Data

US 2005/0177848 A1    Aug. 11, 2005

(30) Foreign Application Priority Data

Feb. 5, 2004    (KR) .................. 10-2004-0007585

(51) Int. Cl.
*H04N 5/445* (2011.01)
*G06F 3/00* (2006.01)
*G06F 13/00* (2006.01)

(52) U.S. Cl. .................. 725/43; 725/44; 725/47

(58) Field of Classification Search .................. 725/25, 725/27, 28, 29, 38, 39, 43, 44, 47, 50, 9–21, 725/32–36, 45–46

See application file for complete search history.

(56) References Cited

U.S. PATENT DOCUMENTS

| | | | |
|---|---|---|---|
| 5,635,989 A * | 6/1997 | Rothmuller | 725/31 |
| 5,699,125 A | 12/1997 | Rzeszewski et al. | |
| 5,953,532 A | 9/1999 | Lochbaum | |
| 6,163,345 A * | 12/2000 | Noguchi et al. | 725/37 |
| 6,175,362 B1 | 1/2001 | Harms et al. | |
| 6,756,997 B1 * | 6/2004 | Ward et al. | 725/42 |
| 6,763,522 B1 * | 7/2004 | Kondo et al. | 725/39 |
| 6,978,310 B1 * | 12/2005 | Rodriguez et al. | 709/231 |
| 6,985,190 B1 * | 1/2006 | Klopfenstein et al. | 348/569 |
| 7,096,483 B2 * | 8/2006 | Johnson | 725/46 |
| 7,120,922 B2 * | 10/2006 | Rodriguez et al. | 725/46 |
| 7,321,923 B1 * | 1/2008 | Rosenberg et al. | 709/217 |
| 7,346,556 B2 * | 3/2008 | Upendran et al. | 725/13 |
| 2002/0097340 A1 | 7/2002 | Takagi et al. | |
| 2002/0101541 A1 * | 8/2002 | Takagi et al. | 348/569 |
| 2003/0056216 A1 * | 3/2003 | Wugofski et al. | 725/46 |

(Continued)

FOREIGN PATENT DOCUMENTS

CN    1142161 A    2/1997

(Continued)

OTHER PUBLICATIONS

John Levine & Margaret Levine Young, The Complete Reference Windows 98, 1998, Osborne McGraw-HIll, pp. 168-174, and 200-205.*

*Primary Examiner* — Brian Pendleton
*Assistant Examiner* — Fernando Alcon
(74) *Attorney, Agent, or Firm* — Birch, Stewart, Kolasch & Birch, LLP

(57) ABSTRACT

A display device and method of managing a list of channel information in a video display device are provided. The display device includes the steps of displaying a first window including a first list of pre-selected channel and/or program information, storing at least one channel and/or program information deleted from the first window to a data storage, displaying a second window including a second list of deleted channel and/or program information stored in the data storage, and selectively restoring a channel and/or program information selected from the second list to the first list.

14 Claims, 4 Drawing Sheets

U.S. PATENT DOCUMENTS

| | | |
|---|---|---|
| 2003/0110500 A1 | 6/2003 | Rodreguez |
| 2004/0078815 A1* | 4/2004 | Lemmons et al. ............ 725/47 |
| 2005/0015804 A1* | 1/2005 | LaJoie et al. ................. 725/44 |
| 2007/0006259 A1* | 1/2007 | Kurose et al. ................ 725/38 |
| 2009/0044226 A1* | 2/2009 | Ellis et al. .................... 725/46 |

FOREIGN PATENT DOCUMENTS

| | | |
|---|---|---|
| EP | 1 244 297 A2 | 9/2002 |
| KR | 1999-0032162 A | 5/1999 |
| WO | WO-02/01871 A1 | 1/2002 |
| WO | WO-03/092272 A1 | 11/2003 |

* cited by examiner

DISPLAY DEVICE AND METHOD OF MANAGING LIST OF CHANNEL INFORMATION IN VIDEO DISPLAY DEVICE

This application claims the benefit of the Korean Patent Application No. 10-2004-0007585, filed on Feb. 5, 2004, which is hereby incorporated by reference as if fully set forth herein.

BACKGROUND OF THE INVENTION

1. Field of the Invention

The present invention relates to an image display device, and more particularly, to a display device and method of managing a list of channel information in a video display device.

2. Discussion of the Related Art

With the widespread use of cable, satellite, and other digital services, the number of channels available to subscribers is increasing. Compared to analog service, one of the advantages to digital service is not only higher quality video and audio, but it also provides various added services, such as on screen channel/program guide. As a result, digital service requires more data than as required by analog service. Because transmitting a large amount of data takes time, data is often compressed prior to the transmission for a faster transmission. Likewise, prior to transmitting a large amount of data related to digital service, video/audio data is corn pressed using a compression medium such as Moving Picture Experts Group-2 (MPEG-2) and Audio Code Number 3 (AC-3). The compressed data is transmitted via cable, satellite, or other service by using Quadrature Phase Shift Keying (QPSK)/VSB/Quadrature Amplitude Modulation (QAM) transmission methods.

With more advanced compression and transmission methods, the video display devices are able to take advantage of improved methods which process much more data than analog service. Consequently, the use of digital service has expanded to provide subscribers with more channels with added service, such as higher quality pictures and sound. Moreover, digital service provides other added service such as home shopping, electronic paper, and stock information. These advanced types of video display devices, like the satellite signal receiver box, could be connected from an external source to a television set employing Phase Alternating Line (PAL)/National Television System Committee (NTSC) standards or can be provided internally in a television set.

Furthermore, with a rapid improvement in multimedia technology, high quality video and audio are becoming a common place. Accordingly, not only are people becoming accustomed to better video and audio, people's expectation and demand for better picture, sound, and other added services are increasing. As such, there is a need for digital television, internet services, and the like to provide multimedia service of such caliber.

As one of the ways for people to enjoy the improved multimedia service, people use television network, broadband, or modem connections to download the multimedia data which are compressed and transmitted via various programming languages such as Hyper Text Makeup Language (HTML). Here, such multimedia data service providers are divided into two major categories—those using the existing television network and the other using modem connection. Subsequently, these types of service providers usually use private section of Moving Picture Experts Group-2 (MPEG-2) stream or Digital Storage Media—Command and Control (DSM-CC) protocol to receive multimedia information from a server.

As facilitated by improvements in compression and transmission methods, an increased number of channels provide more subscriber-oriented information. With an increasing number of channels and information available to subscribers, more and more subscribers desire faster access and controllability to desired channel/program information. In the past, the video display devices only provided limited functions and information such as auto selection and periodic channel searches, which provided limited information to subscribers, such as providing the status of a certain request information or reorganized channel/program information.

However, with the improving technology in digital services, an increasing number of people are likely to become exposed to more channels and more information. The existing device would not be able to process the added information efficiently or effectively. Simply put, more channels and program information means more unwanted or not watched channels. Viewers/users usually delete these channels so as to browse through a large number of channels more efficiently. In other words, this means that there are more channels for the users to delete. Without a better device to accommodate such a growing need and concern, the users would be left performing the deleting operation every time the users browses through a large number of channels. This is inefficient and inconvenient to the users.

SUMMARY OF THE INVENTION

Accordingly, the present invention is directed to a display device and method of managing a list of channel information in a video display device that substantially obviates one or more problems due to limitations and disadvantages of the related art.

An object of the present invention is to provide a display device and method of managing a list of channel information in a video display device, which can store deleted channel/program information so as to be able to restore the deleted information upon a user's request, without any searching process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of managing a list of channel information in a video display device includes the steps of displaying a first window including a first list of pre-selected channel and/or program information, storing at least one channel and/or program information deleted from the first window to a data storage, displaying a second window including a second list of deleted channel and/or program information stored in the data storage, and selectively restoring a channel and/or program information selected from the second list to the first list.

In another aspect of the present invention, a method of managing a list of program information in a video display device includes the steps of displaying a first window including a first list of pre-selected channel and/or program information, storing at least one channel and/or program information deleted from the first window to a data storage displaying a second window including a second list of deleted channel and/or program information stored in the data storage, and permanently deleting a channel and/or program information selected from the second list in response to a user selection.

In another aspect of the present invention, a display device includes a user interface unit receiving commands from a user, a data storage having a first specified section which stores a first list of pre-selected channel information and a second specified section which stores a second list of channel information deleted from the first list of channel information, and a control processor restoring a channel information selected from the second list of channel information back to the first list of channel information.

In a further aspect of the present invention, a user interface unit receiving commands from a user, a data storage having a first specified section which stores a first list of pre-selected channel and/or program information and a second specified section which stores a second list of deleted channel and/or program information deleted from the first list, and a control processor selectively restoring a channel and/or program information selected from the second list back to the first list.

In another aspect of the present invention, a user interface unit receiving commands from a user, a data storage having a first specified section which stores a first list of pre-selected channel and/or program information and a second specified section which stores a second list of deleted channel and/or program information deleted from the first list, and a control processor permanently deleting a channel and/or program information selected from the second list in response to a user selection.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
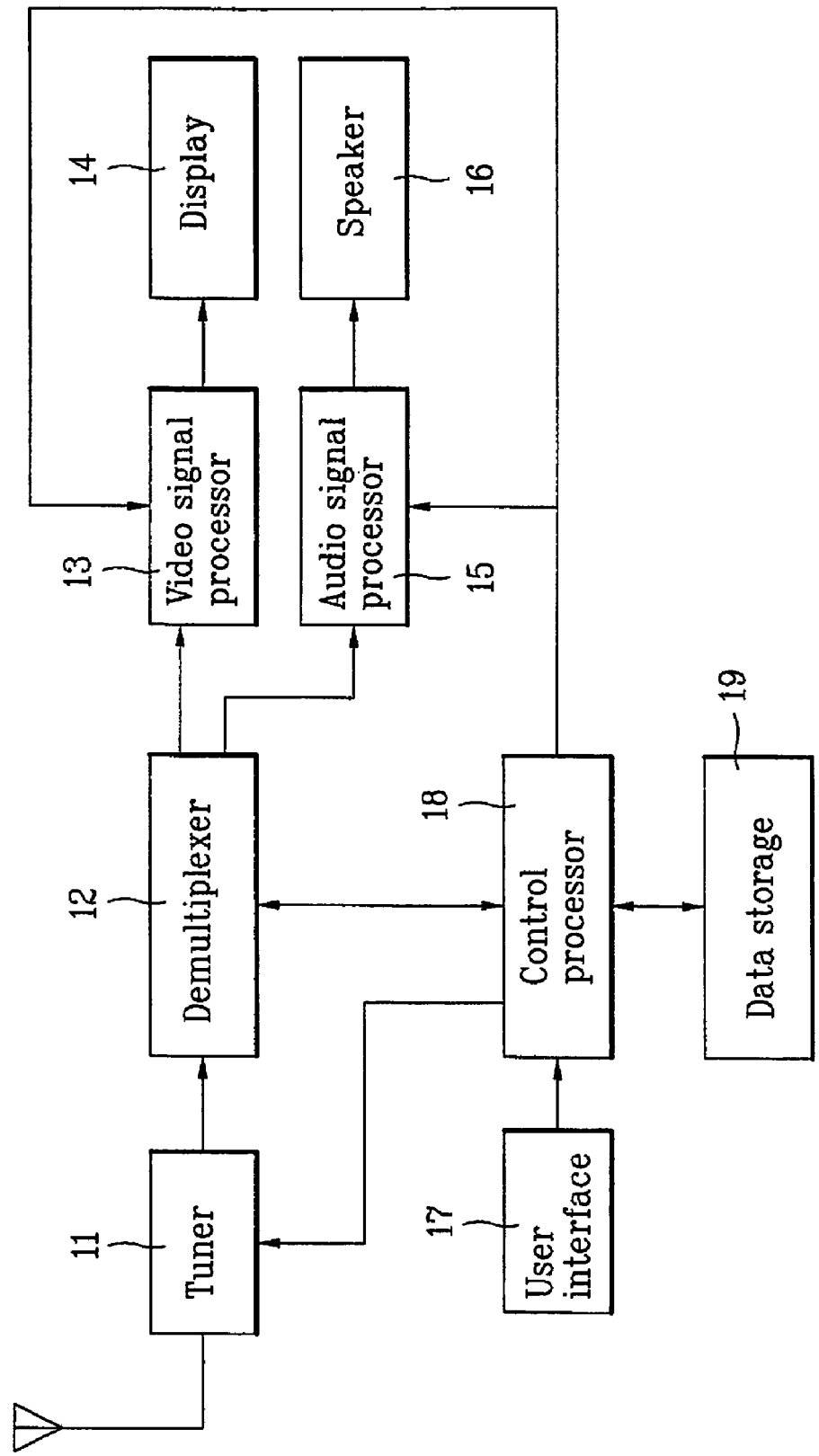
FIG. 1 illustrates is an exemplary embodiment of a video display device structure according to the present invention.

According to FIG. 1, a video display device according to an embodiment of the present invention includes a tuner 11 which receives broadcast signals via antenna, a demultiplexer 12 which separates the signals received from the tuner 11 into video, audio, and other signals, a user interface 17, a control processor 18 which outputs control signals according to an user's input commands via the user interface 17, a video signal processor 13 which receives the control signals from the control processor 18 and transmits the video signal from the demultimplexer 12 to a display 14 based on the control signals, an audio signal processor 15 which receives the control signals from the control processor 18 and transmits the audio signal from the demultiplexer 12 to a speaker 16 based on the control signals, and a data storage 19 which stores channel/program information.

All components of the video display device are operatively coupled.

The operation of the video display device of FIG. 1 is as follows. The user selects a desired channel/program via the user interface 17. The broadcast signal of the selected channel is then tuned by the tuner 11 and passes through the demultiplexer 12 from which the selected broadcast signal is separated into video, audio, and/or other signals under the control of the control processor 18. Other signals may include, but are not limited to, channel/program identification (e.g., 13, 25-1, HDD, etc.), channel type (e.g., M-NET, ABC, HBO, etc.), the description of the broadcast type (e.g., drama channel, music channel, movie channel), signal reception status (e.g., strong, weak, none), the title of the program (e.g., Sopranos, American Idol, etc.), and the synopsis of the program.

The video signal separated at the demultiplexer 12 is transmitted to the video signal processor 13 where the video signal is processed and transmitted to the display unit 14 for display. Similarly, the audio signal at the demultiplexer 12 is transmitted to the audio signal processor 15 where the audio signal is processed and transmitted to the speaker 16 for reproduction. The control processor 18 transmits control signals to the video signal processor 13 and/or audio signal processor 15 according to the command(s) entered (e.g., by a user) via the user interface 17, and the data storage 19 stores a list of pre-selected and deleted channel/program information. The user pre-selects certain channel(s) and/or program(s) based on viewing habits, preference, etc. and a list of such selected items is stored in the data storage 19 for browsing. The deleted channel(s) and/or program(s) is stored in a specified section of the data storage 19. More specifically, when the user enters a command to browse the pre-selected or deleted channel(s) and/or program(s), the control processor 18 transmits the control signals to the data storage 19 to obtain the requested information from the data storage 19.

While browsing the pre-selected channel(s) and/or program(s) list on the display 14, the user may select to delete certain channel/program information from the list via the user interface 17 such as a remote controller. The selected information is deleted from the pre-stored channel/program information list and stored in the specified section of the data storage 19. For example, if the user deletes channel 57 from the pre-stored channel(s) and/or program(s) list, the deleted channel information, including the channel identification, broadcast station identification, channel type, and signal reception status, is stored in a specified section of the data storage 19.

Furthermore, the user may choose to browse a list of deleted channel/program information which is stored in a specified section of the data storage 19. If the user enters a command to view the list of deleted channel/program information, the control processor 18 transmits control signals to the data storage 19 to obtain and display the deleted information stored in the specified section of the data storage 19. From the deleted channel/program information display at the display 14, the user may choose either to restore the deleted channel/program information back to the pre-selected channel/program information list or delete the deleted channel/program information permanently from the list of deleted channel/program information.

The device according to the present invention allows the user to delete or restore channel/program information. If the user selects to delete a pre-selected channel(s) and/or program(s) from the list, the selected channel/program information is not permanently deleted. Rather, the channel/program information deleted from the list is stored in a specified section of the data storage, providing the user an option to restore the deleted channel(s) and/or program(s). In addition, the user is provided an option to browse the deleted channel/program information and choose to restore the deleted channel/program information back to the pre-selected channel(s) and/or program(s) information list. Moreover, the user can acquire channel/program information the user wants restored using the interface terminal for the internet or other network connection.

Figure 2:
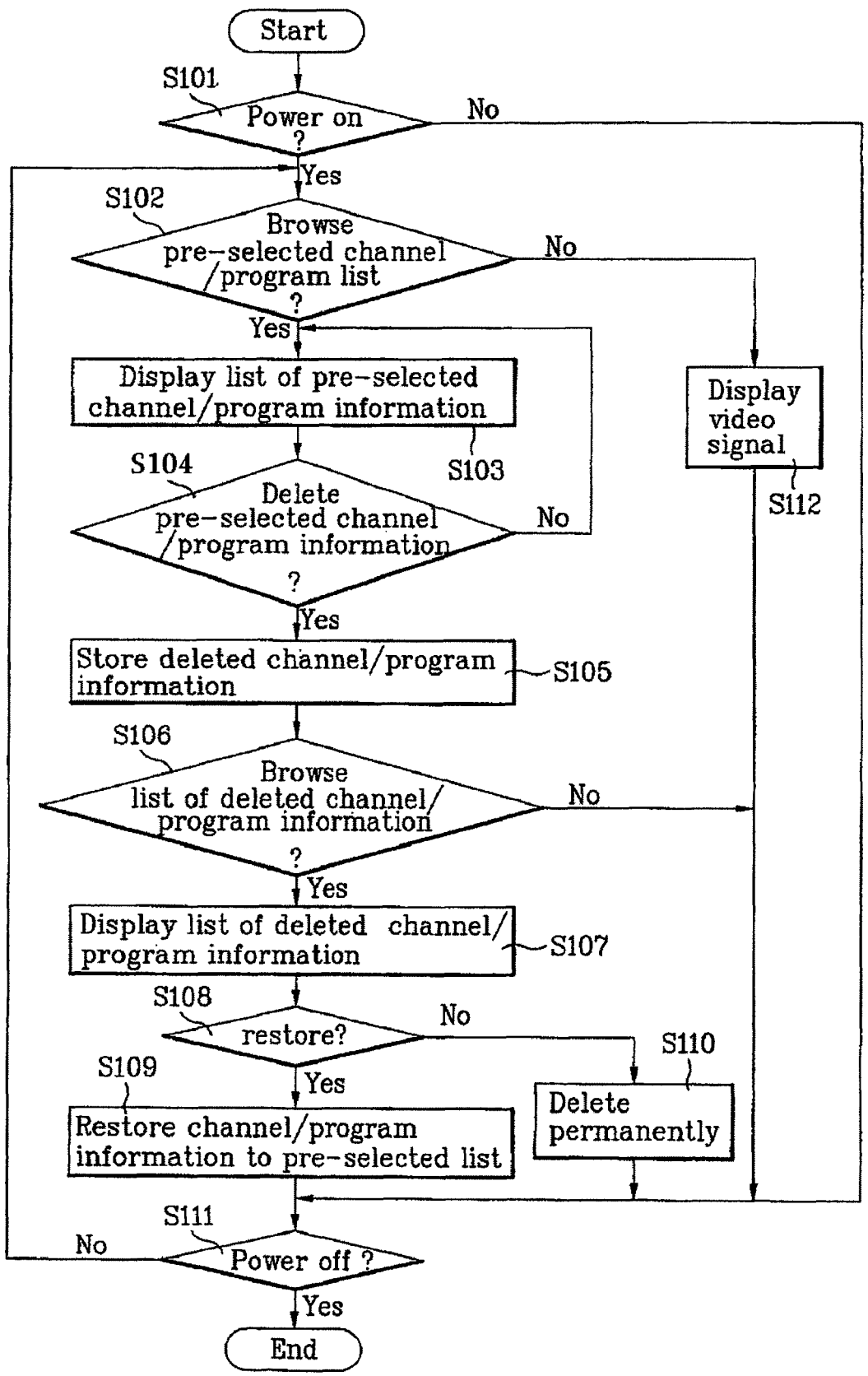
FIG. 2 illustrates an example of a method of controlling channel/program information in a video display device according to the present invention.

FIG. 2 illustrates a flowchart of a method of managing channel/program information according to an embodiment of the present invention. This method can be implemented in the device of FIG. 1 or other suitable device.

Figure 3:
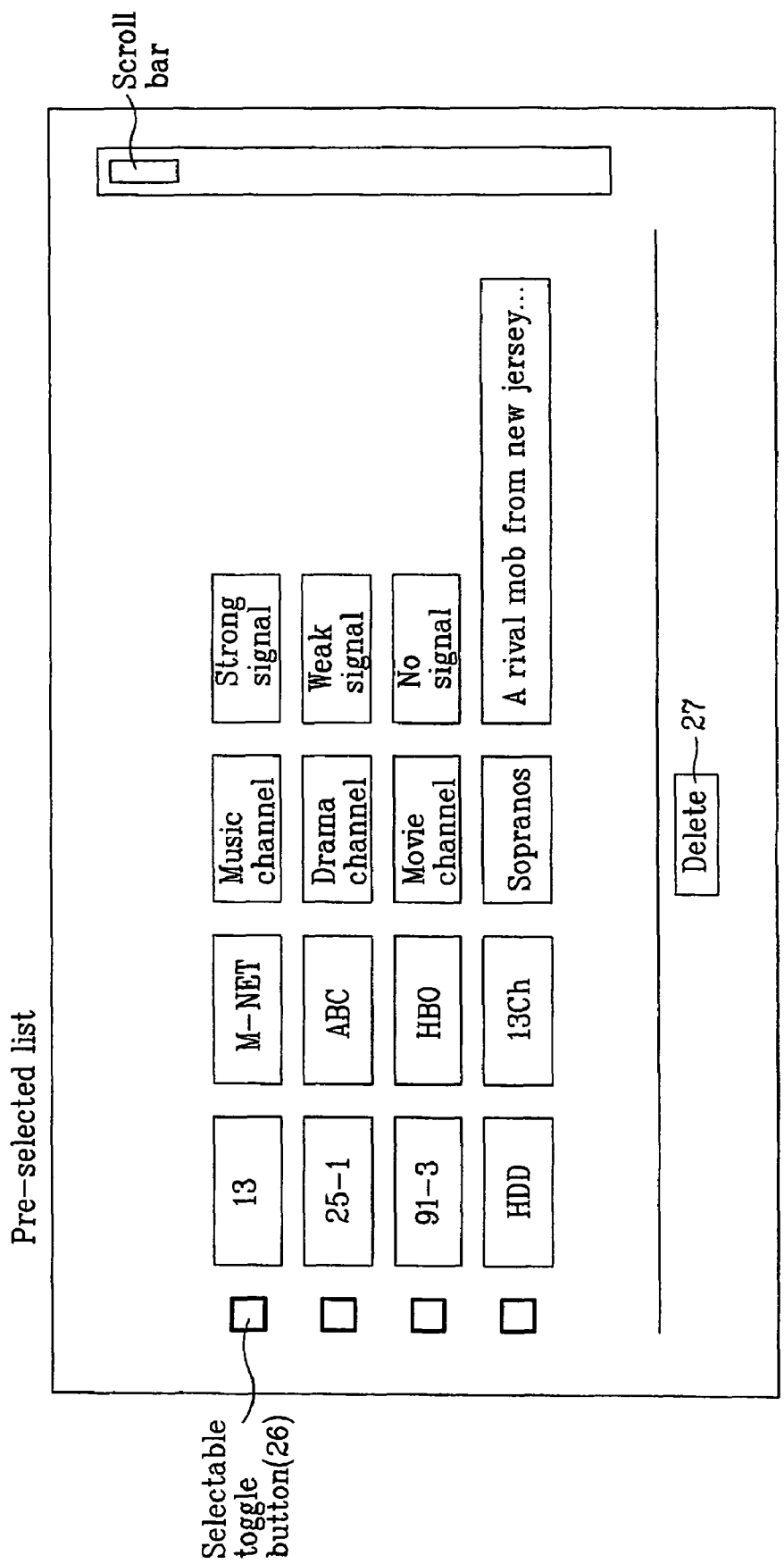
FIGS. 3 and 4 illustrate examples of a detailed description of a set of channel/program information related to the method of the controlling channel/program information in the video display device according to the present invention.

According to FIG. 2 of the present invention, after the user enters a command to turn on the power, the video display device determines whether the user entered a command to browse the pre-selected channel/program information list (S101 and S102). If such a command is entered, then a display of a window including the pre-selected channel/program information list as shown in FIG. 3 is provided at the display 14 for browsing (S103). If such a command was not entered, the device displays on the screen a video and audio signal selected for viewing (S112).

The display window of the pre-selected channels and/or program(s) list as shown in FIG. 3 further includes a selectable toggle button 26 located next to each pre-selected channel/program information, which provides the user the option to select a particular channel/program from the pre-selected channel(s) and/or program(s) information list. In addition, the display window includes a delete button 27 which provides the user an option to delete the selected channel/program information from the pre-selected channel/program information list.

While browsing through the pre-selected channel/program information list, the user could delete certain or all channel(s) and/or program(s) from the pre-selected channel(s) and/or program(s) list (S104). After the selected channel/program information is deleted from the pre-selected channel/program information list, the deleted channel/program information is stored in a specified section of the data storage (S105). The deleted channel/program information stored in the specified section of the data storage is available for browsing by the user. If the user chooses to view the stored deleted channel/program information, a display window including the list of deleted channel/program information is provided as shown in FIG. 4 at the display 14 for browsing (S106 and S107).

Figure 4:
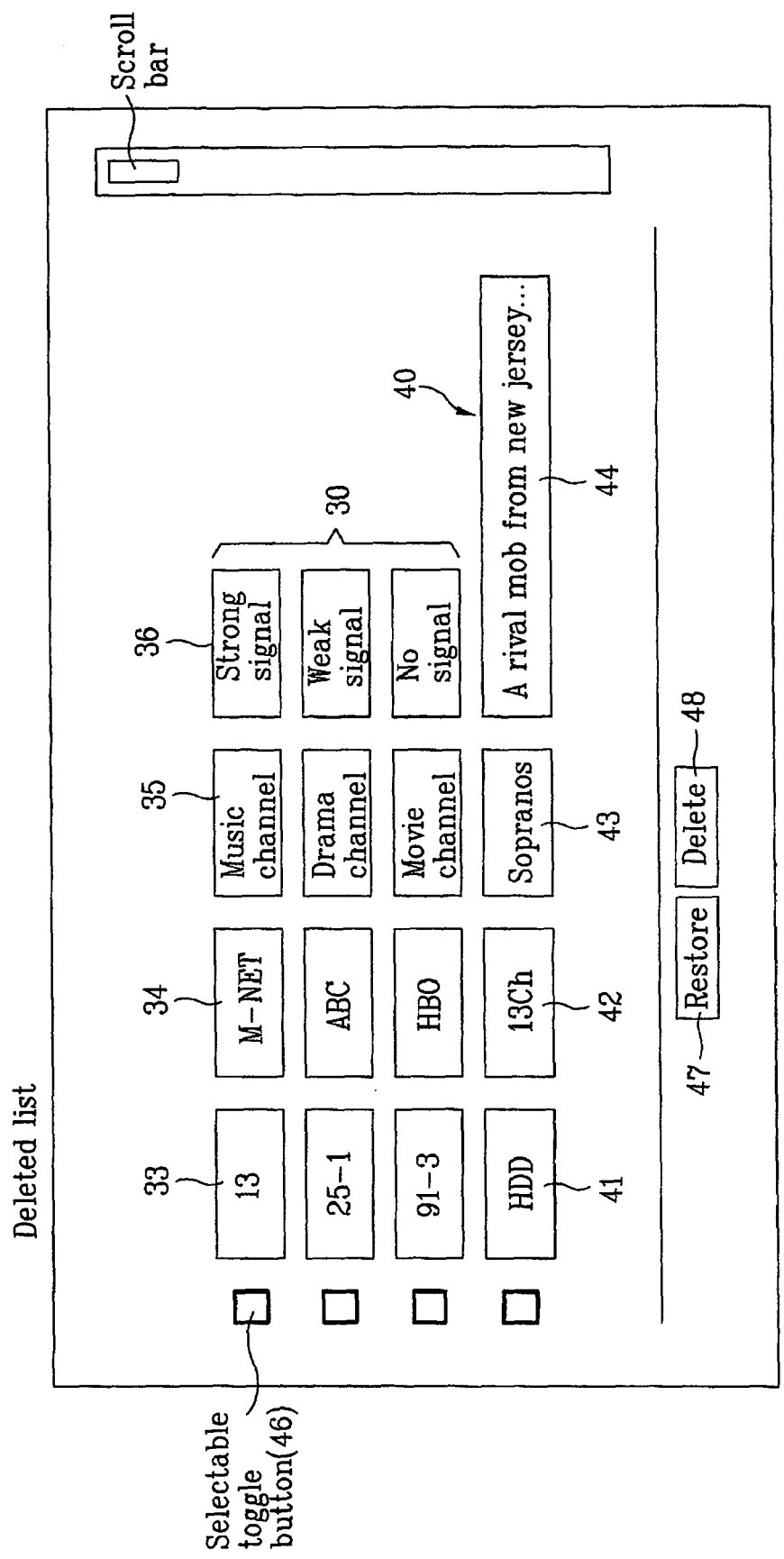

As shown in FIG. 4, the display window of the deleted channel/program information list further includes a selectable toggle button 46 located next to each deleted channel/program information, which provides the user the option to select one or more channel(s) and/or program(s) from the list of deleted channel/program information. In addition, the display window includes a delete button 48 which provides the user the option to permanently delete the selected channel/program information from the list of deleted channel/program information (S110). Also, the user may choose to have the channel/program information listed on the list of deleted channel(s) and/or program(s) information restored. This can be implemented by the selection of a restore button 47 on the window showing the list of deleted channel(s) and/or program(s) infotmation. In such a case, the deleted channel/program information stored in the specified section of the data storage is restored back to the pre-selected channel/program information list. (S108 to S109). However, if the user chooses to delete the deleted channel/program information from the specified section of the data storage, then the channel/program information is permanently deleted (S110). After the user is finished with browsing and editing the channel/program information, the user could turn off the power of the device via the user interface (S111).

As described above, a user could browse the list of pre-selected or deleted channel/program information and the list of deleted channel(s) and/or program(s). FIG. 4 is an illustration of an example of a display window showing a list of deleted channel/program information. More specifically, it shows a set of three deleted channel information(30) and one deleted program information (40). The channel information is represented, starting with a box labeled number 13 as channel identification 33, followed by a broadcast station identification 34, channel type 35, and signal reception status 36. Similarly, program information is represented by a box labeled HDD(41), followed by the channel identification (42), the title of a program (43), and the synopsis of the program (44). The same channel and/or program information is provided on the list of pre-selected items as shown in FIG. 3. The display window as represented in FIGS. 3 and 4 could further include, but are not limited to, additional information and function such as On Screen Display (OSD) and Picture-In-Picture (PIP) to allow a user to view the channel/program while browsing.

In the display window, a selectable toggle button is provided next to each deleted channel/program information. The toggle buttons allow the user to make selections from the list of deleted channel/program information while providing opportunity to continue browsing until all selections are made. After selection(s) are made from the list of deleted channel/program information, the user may either restore or permanently delete the selected channel/program information from the list by choosing a button labeled restore (47) or delete (48). By selecting the restore button (47), the selected channel(s) and/or program(s) from the deleted channel/program information list is restored back to the pre-selected list of channels and/or program(s). Furthermore, by selecting the delete button 48, the selected channel/program information from the deleted channel/program information list is permanently deleted.

To facilitate browsing through the list of pre-selected channel/program information, a different presentation could be used to identify the currently viewed program from other channel(s) and/or program(s). For example, if a user is currently watching a program in channel 7 and decides to browse the list of pre-selected channel/program information, channel 7 on the pre-selected list would be identified distinguishable from other channel(s) and/or program(s). Such an identification can be accomplished through various means such as by the use of color, highlight, font type, or font size. Furthermore, in addition to showing the channel identification, the broadcast station identification, the signal reception status, the picture-in-picture, the Electronic Program Guide (EPG), etc. could also be used to facilitate browsing. The device of FIG. 1 can be a digital TV, and the data storage 19 can be a hard disk drive or EEPROM (Electrically Erasable Programmable Read Only Memory).

As described above, the present invention relates to a video display device and a method of managing a list of channel/program information. Traditionally, when a user deletes channel/program information, information pertaining to the channel/program was permanently deleted automatically so that the deleted information could not be restored at all once deleted. However, in the present invention, even if a user deletes a certain channel/program information, the information is not permanently lost. Rather, the deleted channel/program information is stored in a specified section of the data storage thereby allowing the user to later access the deleted information and choose to either restore or permanently delete the once-deleted channel(s) and/or program(s).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of managing video signal information in a display device, the method comprising:
    pre-selecting an available broadcast channel as indicated from information received by way of a plurality of broadcast signals;
    storing, in a data storage, information corresponding to the pre-selected broadcast channel in a first list, the first list including channel information corresponding to at least the pre-selected broadcast channel;
    displaying a first window including the first list, wherein broadcast channel information corresponding to a broadcast channel currently being displayed for viewing on the display device is distinguished in the first window;
    firstly selecting for deletion information corresponding to at least one broadcast channel included in the first list;
    receiving a user delete command to delete the selected information corresponding to the broadcast channel from the first list, deleting information corresponding to the broadcast channel selected for deletion from the first list and storing the information corresponding to the broadcast channel deleted from the first list as part of a second list, and wherein the information corresponding to the broadcast channel deleted from the first list is no longer displayed as part of the first list;
    displaying a second window including the second list, the second list comprising at least information corresponding to the broadcast channel deleted from the first list;
    secondly selecting information corresponding to at least one broadcast channel from the second list; and
    restoring information corresponding to the selected at least one broadcast channel from the second list back to the first list when a restore command is received, and deleting information corresponding to the selected at least one broadcast channel from the second list when a delete command is received,
    wherein information corresponding to the selected at least one broadcast channel selected for restoration is no longer displayed as part of the second list and is instead displayed as part of the first list, and information corresponding to the selected at least one broadcast channel selected for deletion is no longer available on the display device but can be restored to the first list based on information received through a broadcast signal.

2. The method of claim 1, wherein the broadcast channel information from the first list comprises at least one of a channel identification, a broadcast station identification, a channel genre, and a signal reception status of each pre-selected video signal and wherein the information from the first list is displayed in correspondence to each pre-selected broadcast channel or program.

3. The method of claim 1, wherein the data storage includes at least one of a hard disk drive and EEPROM (Electrically Erasable Programmable Read Only Memory).

4. The method of claim 1, wherein the second window further includes a plurality of toggle buttons enabling a selection of any information from the second list and a restore button for inputting a command.

5. The method of claim 1, wherein the display of the first window and/or the second window includes On Screen Display (OSD) or Picture-In-Picture (PIP).

6. The method of claim 1, wherein the information from the first list comprises at least one of a program source, a channel identification, a program title, and a program synopsis of each pre-selected broadcast channel or program and wherein the information from the first list is displayed in correspondence to each pre-selected broadcast channel or program.

7. The method of claim 1, further comprising:
    receiving a command to delete information from the second list,
    wherein the displayed second window further enables the user to browse the second list according to the pre-selected broadcast channel and to thirdly select at least one pre-selected broadcast channel by referencing the corresponding one of the information from the second list and wherein the received delete command causes the thirdly selected at least one pre-selected broadcast channel to be deleted from a specified section of the data storage.

8. The method of claim 1, wherein the display device is a digital television receiver, and the first and second windows are displayed on a screen of the television receiver.

9. The method of claim 1, wherein the broadcast channels of the first list are pre-selected according to a user selection of the display device and wherein the user selection modifies the stored first list.

10. The method of claim 1, wherein the first window is displayed in response to a first browse command for displaying the information from the first list of each pre-selected broadcast channel and wherein the second window is displayed in response to a second browse command for displaying deleted information from the second list.

11. The method of claim 1, wherein the information of the first list enables selection of a broadcast channel for display by the display device.

12. The method of claim 7, wherein the second window further includes a plurality of toggle buttons enabling a selection of any information from the second list, a restore button for inputting the second command, and a delete button for inputting the third command.

13. A method of managing a list of channel information in a display device receiving a broadcast signal on each of a plurality of channels, the method comprising:
    pre-selecting an available broadcast channel as indicated from information received by way of a plurality of broadcast signals;
    displaying a first window including a first list, the first list indicative of information corresponding to pre-selected broadcast channels, the displayed first window enabling a user to input a delete command to selectively delete information corresponding to at least one broadcast channel from the first list, wherein information corresponding to the broadcast channel selected for deletion is deleted from the first list and stored as part of a second list, wherein the information corresponding to the broadcast channel deleted from the first list is no longer displayed as part of the first list, and broadcast channel information corresponding to a broadcast channel currently being displayed for viewing on the display device is distinguished in the first window;

storing, in response to the delete command, the information corresponding to the at least one deleted broadcast channel in a specified section of a data storage for storing the second list;

displaying, according to said storing, a second window including the second list, and selecting information corresponding to at least one broadcast channel from the displayed second list; and restoring the information corresponding to the selected at least one channel from the second list back to the first list when a restore command is received, and deleting information corresponding to the selected at least one broadcast channel from the second list when a delete command is received, wherein information corresponding to the restored at least one broadcast channel is no longer displayed as part of the second list and is instead displayed as part of the first list, and information corresponding to the at least one broadcast channel deleted from the second list is no longer available on the display device but can be restored based on corresponding information received through a broadcast signal.

14. A display device comprising:

a user interface configured to pre-select an available broadcast channel as indicated from information received by way of a plurality of broadcast signals;

a data storage configured to store a first list comprising information corresponding to pre-selected broadcast channels;

a display unit configured to display a first window including the first list and to separately display a second window including a second list comprising at least information corresponding to broadcast channels deleted from the first list, wherein broadcast channel information corresponding to a broadcast channel currently being displayed for viewing on the display unit is distinguished in the first window;

a control processor configured to control the display of the first window to enable a user to browse the first list and to firstly select information corresponding to at least one broadcast channel from the first list in the first window, and configured to control the display of the second window to enable the user to browse the second list and to secondly select information corresponding to at least one broadcast channel from the second list in the second window; and a user interface unit configured to receive a first command via the displayed first window to delete information corresponding to at least one broadcast channel selected from the first list, and to receive a second command via the displayed second window to restore information corresponding to at least one broadcast channel from the second list back to the first list or delete information corresponding to at least one broadcast channel from the second list, wherein information corresponding to the at least one broadcast channel deleted from the first list according to the first command is no longer displayed as part of the first list and is instead displayed as part of the second list, and wherein information corresponding to the at least one broadcast channel restored from the second list to the first list according to the second command is no longer displayed as part of the second list but is instead displayed as part of the first list, and information corresponding to the at least one broadcast channel deleted from the second list according to the second command is no longer available on the display device but can be restored onto the first list by corresponding information received through a broadcast signal.

* * * * *